(No Model.)
J. NORTON & W. P. GILBERT.
PIPE WELDING BALL.
No. 387,315. Patented Aug. 7, 1888.
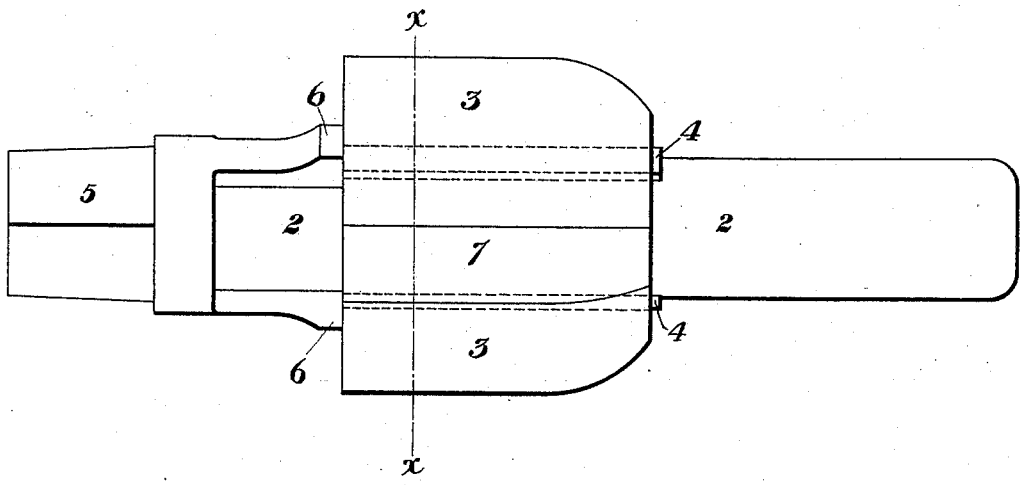
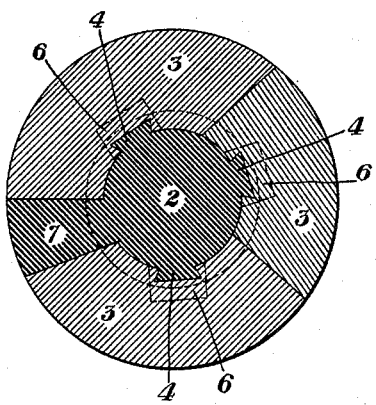
WITNESSES.
H. L. Gill.
N. P. Corwin.
INVENTORS.
John Norton.
William P. Gilbert.
by W. Bakewell & Sons.
their Attorneys.

United States Patent Office.

JOHN NORTON AND WILLIAM P. GILBERT, OF McKEESPORT, PENNSYLVANIA, ASSIGNORS OF ONE-THIRD TO CHARLES E. MANBY, OF SAME PLACE.

PIPE-WELDING BALL.

SPECIFICATION forming part of Letters Patent No. 387,315, dated August 7, 1888.

Application filed February 16, 1888. Serial No. 264,214. (No model.)

*To all whom it may concern:*

Be it known that we, JOHN NORTON and WILLIAM P. GILBERT, of McKeesport, in the county of Allegheny and State of Pennsylvania, have invented a new and useful Improvement in Pipe-Welding Balls; and we do hereby declare the following to be a full, clear, and exact description thereof, reference being had to the accompanying drawings, forming part of this specification, in which—

Figure 1 is a side elevation of our improved pipe-welding ball, and Fig. 2 is a vertical cross-section on the line $x\,x$ of Fig. 1.

Like symbols of reference indicate like parts in each.

Heretofore in the manufacture of wrought-iron pipe by means of welding balls or mandrels a very serious difficulty has been experienced, owing to the liability of the ball to stick inside of the heated pipe. When this happens, it takes a considerable amount of time and labor to remove the ball, with the result generally of spoiling the pipe, so that it has to be cut into two parts, and its commercial value is thereby diminished. These accidents are frequent in pipe-mills, and as no efficient means have as yet been invented for preventing them, we have devised our present improvement.

Referring now to the drawings, our improved pipe-ball consists of a central core, 2, around which is arranged the ball proper, which consists of a number of sections, 3, made in the form of segments of a conoid. The surface of the cylindrical core 2 is provided with longitudinal keys or guide-pieces 4, corresponding in number to the number of the sections 3, and on the sections 3 are formed corresponding keyways or grooves. This enables the sections of the ball to be fitted upon the core 2, and when so fitted they form a conoidal ball of the usual external configuration, the parts of which cannot be withdrawn from the core except lengthwise. The movable sections 3 do not extend entirely around the central core, 2; but interposed between two of them is a section, 7, which is permanently fixed to the core. The core 2 projects from the forward end of the ball a considerable distance, and at the rear it is provided with a squared end, 5, for the attachment of the usual rod by which the welding-ball is manipulated. At the base of the sections 3 are stops 6, which limit their motion on the core, and, when they are adjusted in place, secure their proper alignment.

The operation is as follows: The end of the working-rod has a squared socket, which is fitted on the squared end of the core 2. The welding-ball is placed in the skelp and between the rolls in the usual way, and the operation of welding the pipe therewith is carried on in all respects similar to that now in common use in pipe-mills with the old form of solid ball. In case the ball should stick in the pipe at any place, it may be easily removed in the following way: The workmen take a rod long enough to reach within the pipe back to the forwardly-projecting end of the core 2 and strike upon the core sufficiently hard to drive it back inside the ball-sections 3 until these sections leave their guide-keys 4. The sections then fall together and allow the core to be withdrawn altogether, and the loose sections can then easily be shaken or forced out of the pipe. The fixed section 7 enables the parts thus to collapse when the core is driven out.

Our improvement may be greatly modified in form without departing from the principle of our invention. For example, the sections may be made of different forms and arranged otherwise upon the core than we have shown, and, instead of having keys on the core and gooves on the ball-sections, these parts may be reversed, the grooves being put on the core and the keys on the ball-sections.

The advantages of our invention will be manifest to those skilled in the art. It saves a great deal of time and labor and prevents loss in the pipe which always results from sticking of the ball.

We are aware that a pipe-welding ball formed of separable sections and keys, all of which are arranged about, but detached or detachable from, a central core-piece, is not new, and we do not desire to claim the same.

What we claim, and desire to secure by Letters Patent, is—

1. A pipe-welding ball made in segments arranged around a central core, one of said segments being integral with or secured to the core, said core being removable from the remaining sections or segments, substantially as and for the purpose specified.

2. The core 2, having ball-segments arranged around it, said core being movable longitudinally, so as to enable it to be withdrawn from the ball, and one or more sections, 7, fixed to the core and situate between two or more of the detachable segments or sections, substantially as and for the purpose specified.

In testimony whereof we have hereunto set our hands this 7th day of February, A. D. 1888.

JOHN his X mark. NORTON.
WILLIAM P. GILBERT.

Witnesses:
HENRY W. DE LONG,
JAMES L. DE LONG.